US011706860B2

(12) United States Patent
Dupras et al.

(10) Patent No.: US 11,706,860 B2
(45) Date of Patent: Jul. 18, 2023

(54) HORTICULTURAL LIGHTING SCENARIOS MANAGEMENT SYSTEM AND METHOD

(71) Applicant: SOLLUM TECHNOLOGIES INC., Montreal (CA)

(72) Inventors: Gabriel Dupras, Montreal (CA); Francois Roy-Moisan, Montreal (CA); Jacques Poirier, Montreal (CA); Charles Smith, Montreal (CA); Louis Brun, Montreal (CA); Patrick Menard, Montreal (CA); Marc Tremblay, Montreal (CA)

(73) Assignee: SOLLUM TECHNOLOGIES INC., Montreal (CA)

( * ) Notice: Subject to any disclaimer, the term of this patent is extended or adjusted under 35 U.S.C. 154(b) by 0 days.

(21) Appl. No.: 17/726,848

(22) Filed: Apr. 22, 2022

(65) Prior Publication Data

US 2022/0346209 A1    Oct. 27, 2022

Related U.S. Application Data

(60) Provisional application No. 63/201,316, filed on Apr. 23, 2021.

(51) Int. Cl.
   *H05B 47/155*    (2020.01)
   *A01G 7/04*    (2006.01)

(52) U.S. Cl.
   CPC .......... *H05B 47/155* (2020.01); *A01G 7/045* (2013.01)

(58) Field of Classification Search
   CPC .. H05B 47/105; H05B 47/155; H05B 47/165; H05B 47/175; A01G 7/045; A01G 7/06; A01G 9/249
   See application file for complete search history.

(56) References Cited

U.S. PATENT DOCUMENTS

| 9,644,828 B1 * | 5/2017 | May .................. F21V 23/02 |
| 9,872,357 B1 * | 1/2018 | Aikala .................. H05B 47/19 |

(Continued)

FOREIGN PATENT DOCUMENTS

| WO | 2009158514 A1 | 12/2009 |
| WO | 2016/119063 A1 | 8/2016 |
| WO | 2018200685 A2 | 11/2018 |

OTHER PUBLICATIONS

European Search Report from corresponding European Patent Application No. 22169506.7, dated Aug. 12, 2022, 12 pages.

*Primary Examiner* — Haissa Philogene
(74) *Attorney, Agent, or Firm* — Cooper Legal Group LLC

(57) ABSTRACT

A computer implemented method for managing horticultural lighting scenarios including the steps of receiving lighting scenarios and storing lighting scenario attributes thereof in a data storage; transmitting the lighting scenarios to a horticultural structure for deployment on at least one horticultural lighting apparatus; acquiring runtime data generated during the execution of the lighting scenarios and storing the runtime data on the data storage. The method also comprises: receiving search parameters relative to user defined lighting scenario attributes, generating a scenario data inquiry relative to the user defined lighting scenario attributes and querying the data storage to identify and retrieve lighting scenarios having lighting scenario attributes matching the searched parameters; and receiving a trading request for one of the retrieved lighting scenarios, retrieving the trading policies of the corresponding lighting scenario and enforcing the trading policies of the corresponding lighting scenario. A system for managing horticultural lighting scenarios is also provided.

20 Claims, 9 Drawing Sheets

(56) References Cited

U.S. PATENT DOCUMENTS

| | | | |
|---|---|---|---|
| 10,021,837 B2* | 7/2018 | Greenberg | H05B 47/19 |
| 2019/0037671 A1* | 1/2019 | Noh | H04L 12/282 |
| 2019/0259108 A1* | 8/2019 | Bongartz | G06Q 50/02 |
| 2020/0184153 A1 | 6/2020 | Bongartz et al. | |
| 2022/0256775 A1* | 8/2022 | Poirier | H05B 47/165 |
| 2022/0256776 A1* | 8/2022 | Dupras | G06F 9/455 |
| 2022/0322610 A1* | 10/2022 | Menard | A01G 7/045 |
| 2022/0330406 A1* | 10/2022 | Tremblay | G06Q 10/06 |

* cited by examiner

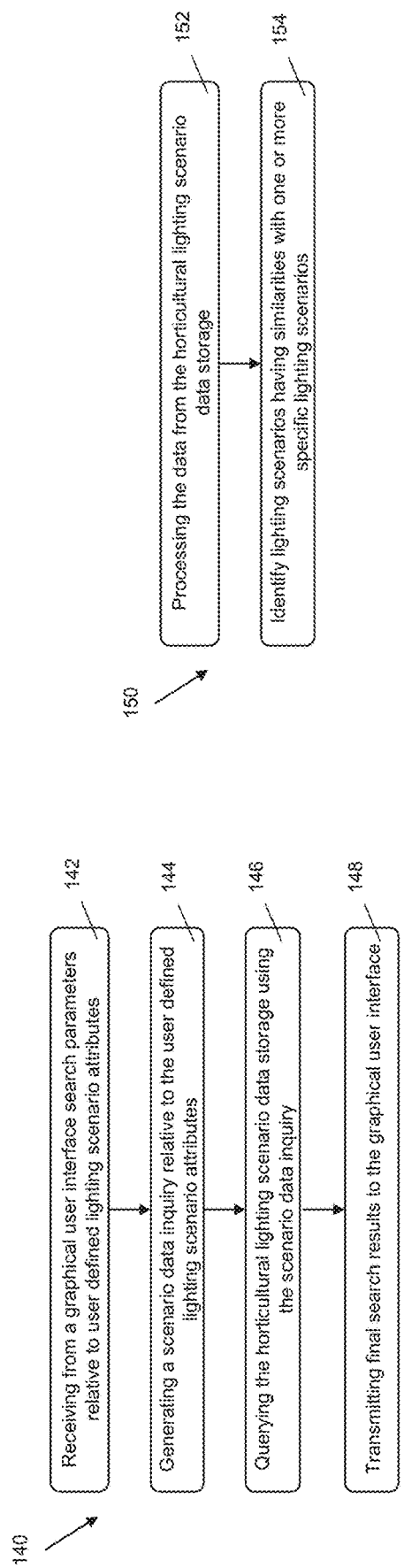

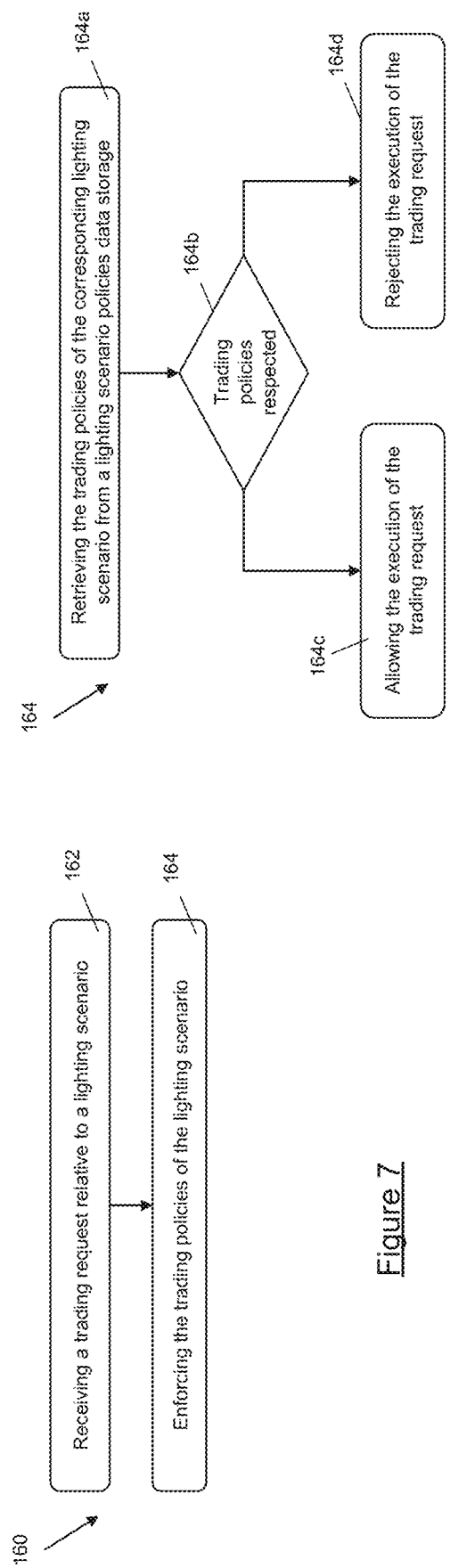

HORTICULTURAL LIGHTING SCENARIOS MANAGEMENT SYSTEM AND METHOD

CROSS-REFERENCE TO RELATED APPLICATIONS

This application claims priority under 35 U.S.C. § 119(e) of U.S. provisional patent application(s) 63/201,316 filed on Apr. 23, 2021, the application of which being hereby incorporated by reference.

TECHNICAL FIELD OF THE INVENTION

The technical field generally relates to management of lighting for crops or plants. More particularly it relates to a system and a method for performing management of horticultural lighting scenarios used for controlling horticultural lighting apparatuses illuminating crops, plants or the like, in a horticultural structure.

BACKGROUND

Artificial light sources can be used in horticulture or agriculture to assist or promote the growth of plants or crops.

In order to produce a desired or optimize growth of the plants or crops, it is known to use the artificial light sources to implement lighting scenarios specifically adapted to the lighting requirements of the corresponding plant or crop to which the artificial light sources provide lighting.

However, it remains a challenge to develop or have access to appropriate horticultural lighting scenarios to be executed by the horticultural light sources illuminating the crop or plant and being adapted to the lighting requirements of the growing plant or crop. Indeed, currently known systems and methods used for managing the horticultural lighting scenarios to be executed on corresponding horticultural light sources tend to be configured to export a lighting scenario developed by a user to the corresponding horticultural light sources, for execution thereon, without allowing lighting scenarios to be shared between users, thereby limiting the possibilities for users to share, search and/or trade lighting scenarios with one another.

In view of the above, there is a need for an improved system and method for managing horticultural lighting scenarios, which would be able to overcome or at least minimize some of the above-discussed prior art concerns.

SUMMARY OF THE INVENTION

In accordance with a first general aspect, there is provided a system for managing horticultural lighting scenarios. The system comprises: a horticultural lighting scenario data storage storing lighting scenario attributes of at least one lighting scenario; a publishing module configured to transmit one of the at least one lighting scenario to a horticultural structure, for deployment of the one of the at least one lighting scenario on at least one horticultural lighting apparatus thereof; a runtime data acquisition module configured to acquire runtime data generated during the execution of the one of the at least one lighting scenario on the at least one horticultural lighting apparatus and store the runtime data on the horticultural lighting scenario data storage as additional lighting scenario attributes of the one of the at least one corresponding lighting scenario; a search module configured to receive search parameters relative to user defined lighting scenario attributes from a graphical user interface, generate a scenario data inquiry relative to the user defined lighting scenario attributes and query the horticultural lighting scenario data storage to identify and retrieve identified lighting scenarios having lighting scenario attributes matching the searched parameters; and a trading module configured to receive a trading request for one of the identified lighting scenarios from the graphical user interface, retrieve the trading policies of the identified lighting scenario and enforce the trading policies of the identified lighting scenario.

In an embodiment, the system further comprises the at least one horticultural lighting apparatus receiving the lighting scenario as input and illuminating plants or crops in accordance with the lighting scenario.

In an embodiment, the system further comprises a classification engine configured to classify the lighting scenarios from the horticultural lighting scenario data storage according to similarities between lighting scenario attributes thereof.

In an embodiment, the classification engine is configured to process the lighting scenario attributes from the horticultural lighting scenario data storage to identify lighting scenarios having at least one of similar patterns of the spectral power distribution over the time period of the lighting scenario, similar programming instructions, similar metadata and similar runtime data.

In an embodiment, the trading request received by the trading module defines at last one of a user request for use, access, transfer, download and/or publishing of a lighting scenario stored in the horticultural lighting scenario data storage.

In an embodiment, the trading module is configured to enforce the trading policies of the identified lighting scenario by determining if the trading policies are respected and allowing the execution of the trading request, if the trading policies of the lighting scenario are respected or rejecting the execution of the trading request, if the trading policies of the lighting scenario are not respected.

In an embodiment, the user defined lighting scenario attributes of the search parameters include at least one of a spectral power distribution over the time period of the lighting scenario, programming instructions relative to the lighting scenario, metadata associated to the lighting scenario and runtime data associated to the lighting scenario.

In an embodiment, the runtime data includes at least one of integral indicator data, integral indicator target data and external information generated or collected during the execution of the lighting scenario in the horticultural structure.

In an embodiment, the search module is configured to generate the scenario data inquiry by selecting an inquiry template stored in a memory and to format the scenario data inquiry based on a required inquiry format.

In accordance with another general aspect, there is also provided a computer implemented method for managing horticultural lighting scenarios. The method comprises the steps of: receiving at least one lighting scenario characterized by lighting scenario attributes and storing the lighting scenario attributes of the lighting scenario in a horticultural lighting scenario data storage. The method also comprises, for each one of the at least one lighting scenario: transmitting the lighting scenario to a horticultural structure for the lighting scenario to be deployed on at least one horticultural lighting apparatus; and acquiring runtime data generated during the execution of the lighting scenario on the at least one horticultural lighting apparatus and storing the runtime data on the horticultural lighting scenario data storage as additional lighting scenario attributes of the lighting scenario. The method further comprises identifying horticultural lighting scenarios from the horticultural lighting scenario data storage based on user defined search parameters; and performing electronic trading of at least one of the identified horticultural lighting scenarios.

In an embodiment, the step of transmitting the lighting scenario to a horticultural structure includes retrieving a plurality of sets of control parameters defining the lighting scenario from the lighting scenario attributes stored in the horticultural lighting scenario data storage for this lighting scenario and uploading the plurality of sets of control parameters to the horticultural structure.

In an embodiment, the runtime data includes at least one of integral indicator data, integral indicator target data and external information generated or collected during the execution of the lighting scenario in the horticultural structure.

In an embodiment, the step of identifying horticultural lighting scenarios from the horticultural lighting scenario data storage includes receiving the search parameters relative to user defined lighting scenario attributes, generating a scenario data inquiry relative to the user defined lighting scenario attributes and querying the horticultural lighting scenario data storage to identify and retrieve the lighting scenarios having lighting scenario attributes matching the searched parameters.

In an embodiment, the step of generating a scenario data inquiry includes selecting an inquiry template stored in a memory and formatting the scenario data inquiry based on a required inquiry format.

In an embodiment, the step of performing electronic trading of at least one of the identified horticultural lighting scenarios includes receiving a trading request for the at least one of the retrieved lighting scenarios, retrieving the trading policies of the corresponding lighting scenario, determining if the trading policies are respected and allowing the execution of the trading request, if the trading policies of the lighting scenario are respected or rejecting the execution of the trading request, if the trading policies of the lighting scenario are not respected.

In an embodiment, the trading request defines at last one of a user request for use, access, transfer, download and/or publishing of a lighting scenario stored in the horticultural lighting scenario data storage.

In an embodiment, the computer implemented method further comprises the step of classifying the lighting scenarios from the horticultural lighting scenario data storage according to similarities between the lighting scenarios.

In an embodiment, the step of classifying the lighting scenarios from the horticultural lighting scenario data storage according to similarities between the lighting scenarios includes processing the data from the horticultural lighting scenario data storage and identify lighting scenarios having lighting scenario attributes similar to the lighting scenario attributes of one or more specific lighting scenarios.

In an embodiment, the step of identifying lighting scenarios having lighting scenario attributes similar to the lighting scenario attributes of one or more specific lighting scenarios includes identifying lighting scenarios offering at least one of similar patterns of the spectral power distribution over the time period of the lighting scenario, similar programming instructions, similar metadata and similar runtime data.

In accordance with another general aspect, there is also provided a non-transitory computer readable storage medium having stored thereon computer executable instructions that, when executed by a processor, cause the processor to perform the steps of the above described method.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 5 is a flowchart showing the substeps of the step of classifying the lighting scenarios from the horticultural lighting scenario data storage according to similarities between the lighting scenarios of FIG. 4.

FIG. 6 is a flowchart showing the substeps of the step of identifying horticultural lighting scenarios from the horticultural lighting scenario data storage of FIG. 4.

FIG. 7 is a flowchart showing the substeps of the step of performing electronic trading of at least one of the identified horticultural lighting scenarios of FIG. 4.

FIG. 8 is a flowchart showing further substeps of the substep of enforcing the trading policies of the lighting scenario of FIG. 7.

DETAILED DESCRIPTION

Figure 1:
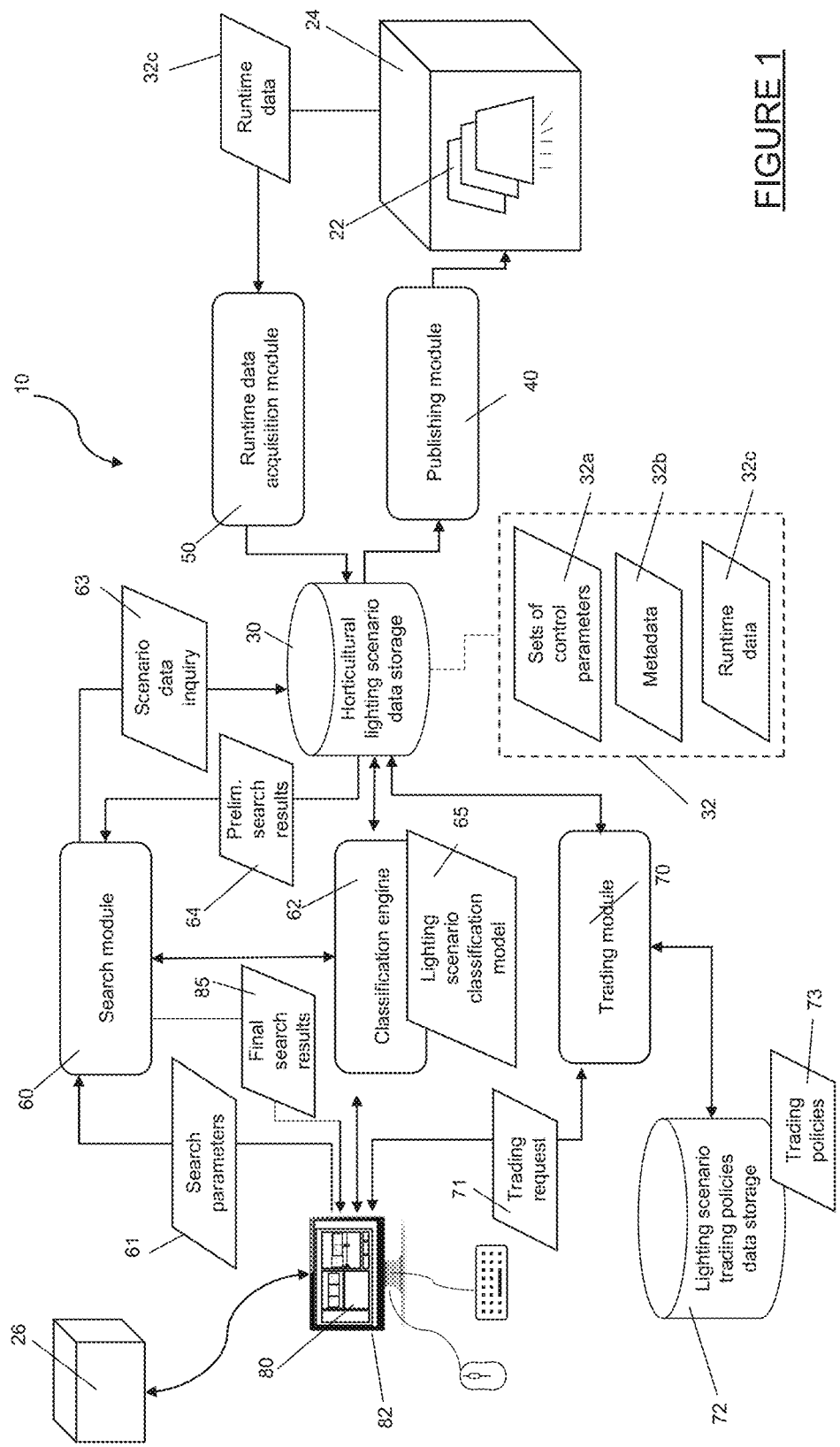
FIG. 1 is a schematic representation of the components of a system for managing horticultural lighting scenarios, in accordance with an embodiment.

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Although the embodiments of the system and corresponding parts thereof consist of certain components and configurations as explained and illustrated herein, not all of these components and configurations are essential and thus should not be taken in their restrictive sense. It is to be understood, as also apparent to a person skilled in the art, that other suitable components and cooperation thereinbetween, can be used for the system, as will be briefly explained herein and as can be easily inferred herefrom by a person skilled in the art.

Moreover, although the associated method includes steps as explained and illustrated herein, not all of these steps are essential and thus should not be taken in their restrictive sense. It will be appreciated that the steps of the method described herein can be performed in the described order, or in any suitable order. In an embodiment, steps of the proposed method are implemented as software instructions and algorithms, stored in computer memory and executed by processors. It should be understood that servers and computers are therefore required to implement the proposed system, and to execute the proposed method. In other words, the skilled reader will readily recognize that steps of various above-described methods can be performed by programmed computers. In view of the above, some embodiments are also intended to cover program storage devices (e.g. digital data storage media), which are machine or computer readable and encode machine-executable or computer-executable programs or instructions, wherein said instructions perform some or all of the steps of said above-described methods. The embodiments are also intended to cover computers programmed to perform said steps of the above-described methods.

It should be appreciated by those skilled in the art that any block diagrams herein represent conceptual views of illustrative circuitry embodying the principles disclosed herein. Similarly, it will be appreciated that any flow charts and transmission diagrams, and the like, represent various processes which can be substantially represented in computer readable medium and so executed by a computer or processor, whether or not such computer or processor is explicitly shown.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

The term "computing device" is used to encompass computers, servers and/or specialized electronic devices which receive, process and/or transmit data. Computing devices are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is, of course, chosen according to the desired use, whether it should retain instructions, or temporarily store, retain or update data.

One skilled in the art will therefore understand that each such computing device typically includes a processor (or multiple processors) that executes program instructions stored in the memory or other non-transitory computer-readable storage medium or device (e.g. solid state storage devices, disk drives, etc.). The various functions, modules, services, units or the like disclosed hereinbelow can be embodied in such program instructions, and/or can be implemented in application-specific circuitry (e.g. ASICs or FPGAs) of the computers. Where a computer system includes multiple computing devices these devices can, but need not, be co-located. In some embodiments, a computer system can be a cloud-based computing system whose processing resources are shared by multiple distinct business entities or other users.

It should be noted that, in the context of the current disclosure, the expression "plants or crops" may encompass a broad variety of multicellular organisms, including photosynthetic eukaryotes. Non limitative examples of plants or crops are seedlings, ornamental crops, ornamental plants, plugs, liners, fruits, small fruits, vegetables, leafy greens, herbs, young plants, high-value crops, and many others. The plants or crops may be produced for human food, non-human food or non-food applications. The growing process of the plants or crops generally includes a plurality of subsequent plant growth stages, such as, for example, seed germination (or "sprout"), seedling, vegetative, bud stage (or "budding"), flowering and ripening. It should be understood that, in the present description, the plants or crops can be at any one of the plant growth stages or at a transition between any two subsequent growth stages.

The expression "horticultural light", synonyms and derivatives thereof will be used throughout the present disclosure, and refers to the use of optical techniques, systems, and methods for assisting, maintaining, stimulating and/or optimizing plants or crops growth. The horticultural light may irradiate or illuminate the plants or crops during any one of the plant growth stages. The horticultural light, which is the light generated by the horticultural lighting apparatus, may be produced or generated using an artificial light source or similar devices, apparatuses, and systems. Non-limiting examples of artificial light sources include incandescent light sources, fluorescent light sources, high-intensity discharge (HID) light sources such as mercury vapor, metal halide (MH), high-pressure sodium (HPS) and low-pressure sodium (LPS) light sources, solid-state light sources including LED light sources, and laser sources. The horticultural light is associated with an illumination spectrum or profile. In some implementations, the horticultural light produced by the horticultural lighting apparatus has a profile substantially similar to light reaching the crop or plant.

The expression "illumination spectrum" is used to broadly refer to the spectral power distribution of an illumination. The illumination spectrum can represent the distribution of power radiated per unit area and per unit wavelength or frequency over a spectral region of the electromagnetic spectrum. It should be noted that using horticultural light may be used to irradiate or illuminate plants or crops growing in a horticultural structure providing regulated climatic conditions to the plants or crops. Nonlimitative examples of horticultural structures include greenhouse, glasshouse and hothouse.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 250 nm to about 2500 nm. However, this range is provided for illustrative purposes only and some implementations of the present techniques may operate outside this range. Also, the skilled person will appreciate that the definition of the ultraviolet, visible and infrared ranges in terms of spectral ranges, as well as the dividing lines between them, can vary depending on the technical field or the definitions under consideration, and are not meant to limit the scope of applications of the present techniques.

The expressions "natural light" or "natural light conditions" generally refer to light having spectral characteristics corresponding or similar to those of sunlight, moonlight or starlight. The spectral profile of natural light, particularly sunlight, varies as a function of geographic location, time of day, time of year, weather, cloud coverage, and several other factors. Several standards are known in the art to provide a spectral reference for natural light. For example, the Commission internationale de l'éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation. Accordingly, standard illuminants extend within the solar radiation spectrum. For example, Standard Illuminant D65 extends from 300 nm to 830 nm. Non-limiting examples of natural light sources include sunlight, moonlight, starlight, twilight, lightning, and firelight.

In the present description, the term "solid-state light emitter" refers to any light-emitting device that converts electrical energy into electromagnetic radiation through the recombination of electronic carriers (i.e., electrons and holes) in a light emitting layer or region. The emitting layer or region can include, but is not limited to, silicon, silicon carbide, gallium nitride and/or other semiconductor materials, and may or may not include a substrate such as sapphire, silicon, silicon carbide and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical cavity surface emitting lasers (VCSELs), other semiconductor light emitting devices or lamps, organic light-emitting diodes (OLEDs), and polymer light-emitting diode (PLEDs).

The expression "lighting scenario" is understood to refer to the generation of light, such as for illuminating purposes, according to predetermined optical characteristics (e.g. spectral content, intensity, polarization) that vary or evolve over time during a given time period. The optical characteristics of the generated light may correspond to or emulate those of natural lighting conditions. The natural light may emulate or be inspired from the actual light conditions experienced at a specific geographical location, date and time. It is appreciated that devising lighting scenarios that combine natural light conditions corresponding to different geographical locations is possible in some applications (e.g. a scenario could be build using sunrise, midday and sunset conditions corresponding to three distinct locations on Earth, at the same or different dates). In other embodiments, however, the natural light conditions may be different from real life conditions on Earth. By way of example, the spectrum of natural light generated according to the method described herein may differ from an actual spectral content of sunlight due to the absence of spectral components which are undesired or unnecessary in a given application context, or conversely by the enhancement or addition of wavelengths which are considered advantageous or required. The present techniques may rely on the use of solid-state light emitters. The solid-state light emitters can be driven to produce the lighting scenario using sets of control parameters. It should be noted that a plurality of lighting scenarios may be combined to collectively determine a "recipe" or a "recipe bundle". The recipe or the recipe bundle refers to a sequence of lighting scenarios.

In some embodiments, the lighting scenario may emulate lighting conditions over the course of a day, from dawn to dusk, or over a portion of a day. Indeed, the spectral contents of light reaching a particular location on earth from the Sun is not constant as the day progress. In some instances, it can be customary to characterize natural light according to its Correlated Color Temperature (CCT) value, expressed in Kelvin (K). By convention, the CCT is defined by the CIE as "the temperature of the Planckian radiator whose perceived color most closely resembles that of a given stimulus at the same brightness and under specified viewing conditions" (CIE/IEC 17.4:1987, International Lighting Vocabulary). Lower CCT values correspond to "warmer" light. Hence, a day with a clear blue sky can begin at dawn with light in a warm CCT spectrum range, such as between 1500K and 3000K, then progress to about 5000K to 7500K at mid-day and return to the 1500K to 3000K range towards dusk. In horticultural or agricultural applications, the light conditions in a region of the world from which a cultivated produce originates or where this produce is known to thrive can be emulated (e.g. growing tomatoes using light conditions from a sunny day in June in Tuscany). In other examples, the lighting conditions may be adapted in view of observations or discoveries regarding optimal or enhanced lighting conditions for growing a given agricultural output, such as for example to follow the McCree Curve, which represents the average photosynthetic response of plants to light energy.

In the context of the current disclosure, the expression "integral indicators" will be used to refer to any parameters or measurable factors representative of the horticultural light, or that may be associated with the operation, characterization or control of the horticultural light. The integral indicators may be indicative of a target, e.g., a value of a given parameter to be reached at the end of an illumination cycle, photoperiod, or sequence. Nonlimitative examples of integral indicators are:

the light integral to determine the photosynthetic photon flux (PPF) or the photosynthetic photon flux density (PPFD);

the light integral to determine the PPFD or the PFD associated with each wavelength;

the CCT integral (measured in Kelvins);

the integral to determine the relative intensity (expressed in relative %) associated with each wavelength;

the integral to determine the power consumption (expressed in kW) associated with each wavelength;

the integral to determine the relative intensity (expressed in relative %) associated with each LED;

the integral to determine the power consumption (expressed in kW) associated with each LED;

the power consumption integral (expressed in kW); and the daily light integral (DLI) determining the number of photosynthetically active photons accumulated in a square meter over a 24-hour period (expressed in $mol \cdot m^{-2} \cdot d^{-1}$).

As it will be understood from the above examples, the integral indicators assign numbers to functions in a way that describes dimensions or parameters of interest that may arise by combining instantaneous values of a given dimension or parameter over a given period or sub-period.

In the present description, the expression "external information" will be used to refer to data that may influence the horticultural light or its control, while not necessarily being representative of the horticultural light. Non limitative examples of external information are the weather, the grid rate schedule, the data generated, produced or obtained with the sensors being used in the horticultural structure, the zone(s) of the horticultural structure, the power consumption of the lighting apparatus(es), and the data associated with plug-in API. In some embodiments, the external information may include growth parameters of the crops or plants. Examples of growth parameters include, but are not limited to absolute growth rate, relative growth rate, dimensions of the crops of plants or a portion thereof (e.g. roots, stems, leaves, buds, flowers, fruits, nodes, internodes and the like), and any other parameters related to the growth of the crops or plants.

In the present description, the expression "runtime data" will be used to refer to data generated during execution of a lighting scenario by one or more corresponding horticultural lighting apparatus in a horticultural structure. The runtime data can include integral indicator data relative to integral indicators defining parameters representative of the characterization or control of the horticultural lighting apparatus achieved during the execution of the lighting scenario, integral indicator target data relative to integral indicator targets defining parameters representative of the characterization or control of the horticultural lighting apparatus which are desired as a result of the execution of the lighting scenario, as well as external information data representative of the external information collected during the execution of the lighting scenario in the horticultural structure (e.g. the weather, the grid rate schedule, the data generated, produced or obtained from the sensors used in the horticultural structure, the zone(s) of the horticultural structure, the power consumption of the lighting apparatus(es), data associated with plug-in API, etc.).

The present description generally relates to methods and systems for managing horticultural lighting scenarios to be implemented in a corresponding horticultural structure using a horticultural lighting apparatus (or a pool of horticultural lighting apparatuses). Broadly described, the present system and method provide a centralized storage of horticultural lighting scenarios and the corresponding runtime data received following the execution of the associated scenario in a horticultural structure. The centralized storage of the horticultural lighting scenarios and the corresponding runtime data allows sharing, classification, search and/or trading of the horticultural lighting scenarios between multiple users or groups of users, such that users generating the horticultural lighting scenarios can distribute the generated horticultural lighting scenarios and acquirers can select, access, download and/or publish the desired horticultural lighting scenarios, for subsequent deployment and execution of the horticultural lighting scenarios on the acquirer's horticultural structures using similar (or compatible) horticultural lighting apparatuses to the ones for which the corresponding lighting scenario has been originally generated.

System for Managing Horticultural Lighting Scenarios

Figure 2:
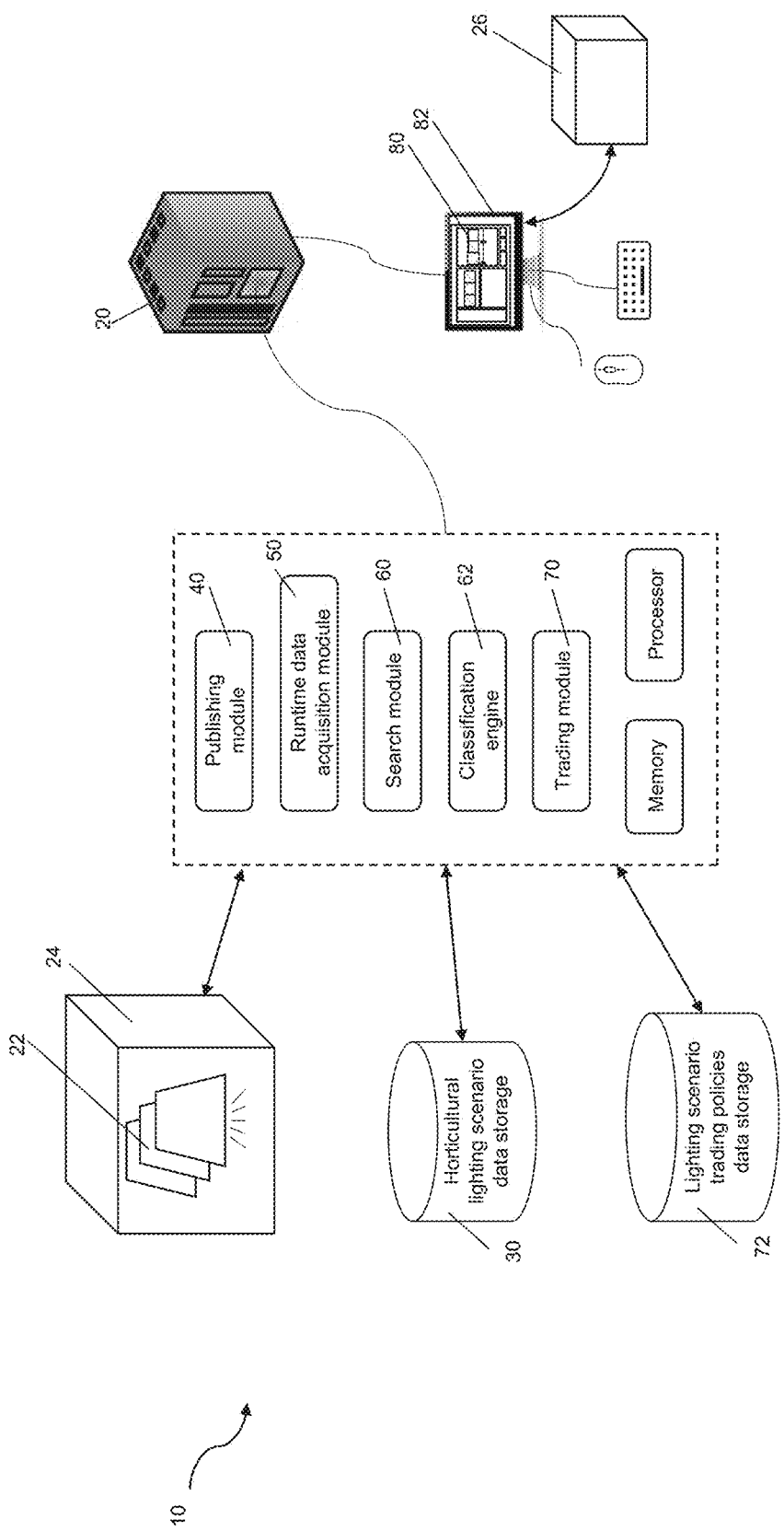
FIG. 2 is another schematic representation of the components of the system for managing horticultural lighting scenarios of FIG. 1.

Referring to FIGS. 1 and 2, there is shown embodiments of a system 10 for managing horticultural lighting scenarios used for driving a horticultural lighting apparatus 22 in a horticultural structure 24. It will be understood that even though the system 10 is described herein in connection with lighting scenarios, the system 10 can be adapted to manage any types of lighting sequence, such as, for instance lighting recipes, lighting recipe bundles, etc.

In the embodiment shown, the system 10 includes a horticultural lighting scenario data storage 30, a scenario publishing module 40, a runtime data acquisition module 50, a search module 60, a trading module 70 and a graphical user interface 80. In an embodiment, at least one of the scenario publishing module 40, runtime data acquisition module 50, search module 60, trading module 70, and graphical user interface 80 can be implemented via programing instructions stored in a memory of one or more system computing devices 20. One skilled in the art will understand that the horticultural lighting scenario data storage 30 can be, for instance, a databases, a data repository, a data store, etc.

One skilled in the art will understand that the modules, data sources and other components of the system described herein are in data communication with one another. It should be noted that the expression "data communication" may refer to any types of direct connection and/or indirect connection. For example, the modules, data sources and other components of the system can be connected through direct communication such as a wired connection or via a network allowing data communication between computing devices or components of a network capable of receiving or sending data, which includes publicly accessible networks of linked networks, possibly operated by various distinct parties, such as the Internet, private networks (PN), personal area networks (PAN), local area networks (LAN), wide area networks (WAN), cable networks, satellite networks, cellular telephone networks, etc. or combination thereof.

In an embodiment the system 10 can further include the horticultural lighting apparatus 22 receiving the lighting scenario as input(s) and illuminating the plants or crops in accordance with the lighting scenario. Alternatively, the system 10 can be provided independently of the horticultural lighting apparatus 22 and the corresponding horticultural structure 24, such that the system 10 can be in data communication with the horticultural lighting apparatus 22 to transmit data thereto and receive data therefrom. In some embodiments, the horticultural lighting apparatus 22 can be a lamp similar to the lighting system described in international patent application WO 2016119063, the content of which being incorporated herein by reference. One skilled in the art will understand that even though a single horticultural lighting apparatus 22 is discussed herein, in an embodiment, a plurality of horticultural lighting apparatuses 22 (i.e. a pool of horticultural lighting apparatuses 22) could be used. For instance, the proposed system 10 can be used to control the horticultural light generated or produced by a plurality of lighting apparatuses 22 in a horticultural structure 24 or in one or more zone(s) of the horticultural structure 24. Of note, the horticultural lighting apparatuses 22 can be simultaneously, sequentially or concurrently controlled, in the horticultural structure 24 or in one or more zone(s) of the horticultural structure 24, depending on the target applications.

The horticultural lighting scenario data storage 30 is configured to store lighting scenario attributes 32 for the generated lighting scenarios. The lighting scenario attributes 32 are specific to each one of the lighting scenarios and characterize the corresponding lighting scenarios to be shared with other users. For example and without being limitative, the lighting scenario attributes 32 can include sets of control parameters 32a for the horticultural lighting apparatuses 22 which define the pattern of the spectral power distribution over the time period of the lighting scenario, metadata 32b specific to the lighting scenario and runtime data 32c, which will be defined below.

In an embodiment, the lighting scenario attributes 32 for each lighting scenario can be provided in a dataset including the plurality of sets of control parameters 32a for the horticultural lighting apparatuses 22. Each set of control parameters 32a can be associated to an illumination state of the horticultural lighting apparatus 22. The dataset can for example be stored as a relational database and can have a database format used in the art, such as Domino, SQL, SCSV, Office 365, or the like. In the context of controlling horticultural light, the sets of control parameters 32a can include the different driving parameters of the horticultural lighting apparatus 22. In an embodiment, the metadata 32b relative to each corresponding horticultural lighting scenario can also be stored in the horticultural lighting scenario data storage 30, as part of the corresponding dataset 34. In an embodiment, the dataset including a corresponding lighting scenario and the associated metadata 32b can therefore include textual information, numeral information, time information, date information, image information, and any combinations thereof. For example and without being limitative, in an embodiment, the metadata 32b can include information including a name of the lighting scenario, a textual description of the horticultural lighting scenario, keywords associated to the horticultural lighting scenario, the name of the creator of the horticultural lighting scenario, the creation date and/or time of the horticultural lighting scenario, the last update date and/or time of the horticultural lighting scenario, the target crop type, etc.

The publishing module 40 is configured to acquire the lighting scenario attributes 32 of a lighting scenario generated and stored in the horticultural lighting scenario data storage 30 and to transmit the lighting scenario attributes 32 to a horticultural structure 24 for the lighting scenario to be deployed on horticultural lighting apparatuses 22 thereof (i.e. for controlling horticultural lighting apparatuses 22 of the horticultural structure 24, to execute the lighting scenario). Therefore, in an embodiment, the publishing module 40 is configured to retrieve the plurality of sets of control parameters defining the lighting scenario of the lighting scenario attributes 32 (i.e. the control parameters for controlling the horticultural lighting apparatuses 22 to execute the lighting scenario) from the horticultural lighting scenario data storage 30 and to upload the plurality of sets of control parameters 32a to the horticultural structure 24 (or to a data source in data communication therewith and used by the horticultural structure 24) for implementation of the sets of control parameters 32a on the horticultural lighting apparatuses 22 (i.e. for controlling horticultural light apparatus 22 in accordance with the sets of control parameters 32a and thereby produce a series of reference illumination states associated to a plurality of lighting reference points of the lighting scenario (and, in an embodiment, transition illuminations between the reference illumination states)). One skilled in the art will understand that the publishing module 40 can output the plurality of sets of control parameters 32a as a batch or a stream of data sent towards the horticultural structure 24. In an embodiment, in the horticultural structure 24, the sets of control parameters 32a can be stored in a memory (not shown) of the horticultural lighting apparatuses 22 or in data communication therewith.

During the execution of the lighting scenario in the horticultural structure 24, runtime data 32c regarding the execution of the lighting scenario will be generated. As described in more details above, the runtime data 32c can include, for instance integral indicator data, integral indicator target data and external information generated and/or collected during the execution of the lighting scenario in the horticultural structure.

The runtime data acquisition module 50 is configured to acquire from the corresponding horticultural structure 24, the runtime data 32c generated during the execution of the lighting scenario, and to transmit the runtime data 32c back to the horticultural lighting scenario data storage 30, for storage thereof as additional lighting scenario attributes 32 of the corresponding lighting scenario. In an embodiment, the runtime data 32c can be included in the dataset of the corresponding lighting scenario, such that the dataset includes the plurality of sets of control parameters 32a for the horticultural lighting apparatuses 22, the metadata 32b associated to the lighting scenario and the runtime data 32c. One skilled in the art will understand that the runtime data acquisition module 50 can receive the runtime data 32c generated during the execution of the lighting scenario as a batch or a stream of data and can provide the runtime data 32c to the horticultural lighting scenario data storage 30 as a batch or a stream of data. In an embodiment (not shown), the runtime data 32c can be temporarily stored in a data source in data communication with the horticultural structure 24, and be retrieved therefrom by the runtime data acquisition module 50 for transfer to the horticultural lighting scenario data storage 30. In an alternative embodiment, the runtime data 32c can be communicated to the horticultural lighting scenario data storage 30 by the runtime data acquisition module 50 in real time (or near real time) during execution of the lighting scenario in the horticultural structure 24.

One skilled in the art will understand that the runtime data acquisition module 50 therefore operates to update the horticultural lighting scenario data storage 30 with the runtime data 32c of the lighting scenarios, upon executions of the lighting scenarios on the horticultural lighting apparatuses 22, in order to store the most accurate and complete data, for the lighting scenario attributes 32 associated to of each one of the lighting scenarios and stored in the horticultural lighting scenario data storage 30. As will be described in more details below, the quantity and quality of the data stored as lighting scenario attributes 32 relative to the lighting scenarios will help searching, sorting and/or classifying the lighting scenarios, for user selection of the scenario best suited to the users' needs.

The search module 60, is configured to receive search parameters 62 relative to user defined lighting scenario attributes and to generate a scenario data inquiry 63 including the user defined lighting scenario attributes associated with the search parameters 62. The scenario data inquiry 63 is used to query the horticultural lighting scenario data storage 30 to identify and retrieve the lighting scenarios stored therein and having lighting scenario attributes 32a matching the searched parameters 62. In an embodiment, the search module 60 can be configured to generate the scenario data inquiry 63 using one or more inquiry templates stored in a memory of the system computing device 20, with the scenario data inquiry 63 being formatted based on a required inquiry format for querying the horticultural lighting scenario data storage 30 and the type of lighting scenario attribute 32 to be searched. For example, the scenario data inquiry 63 can be a database query for querying one or more database(s) storing the datasets including the lighting scenario attribute 32 corresponding to each one of the lighting scenarios.

For example and without being limitative, in an embodiment, the user defined lighting scenario attributes of the search parameters 62 can include at least one of a spectral power distribution over the time period of the lighting scenario, programming instructions relative to lighting scenario, metadata associated to a lighting scenario, runtime data associated to a lighting scenario, etc. Concerning the metadata associated to a lighting scenario and/or runtime data associated to a lighting scenario, it will be understood that individual attributes thereof can each be used as user defined lighting scenario attributes. In other words, for example, any one of a name, a textual description, keywords, name of the creator, creation date/time, last update date/time, target crop type, etc., can be used as user defined lighting scenario attributes relative to a metadata, and any one of integral indicator, integral indicator target, weather, grid rate schedule, sensor data, power consumption of the lighting apparatus(es), etc., can be used as user defined lighting scenario attributes relative to a runtime data.

The search module 60 therefore queries the horticultural lighting scenario data storage 30 using the scenario data inquiry 63 and receives preliminary search results 64 including the lighting scenarios stored in the lighting scenario data storage 30 and having lighting scenario attributes 32a matching the searched parameters 62.

As will be described in more details below, in an embodiment, the search parameters 62 relative to the user defined lighting scenario attributes can be received from a graphical user interface 80, displayed on a display screen of a user computing device 82 in data communication with the system computing device 20. In an embodiment, final search results 85 corresponding to the preliminary search results 64 including the lighting scenarios having lighting scenario attributes 32 matching the searched parameters 32 and retrieved from the horticultural lighting scenario data storage 30 can also be provided to the user through the communication of the final search results 85 (being the same as the preliminary search results 64) to the graphical user interface 80 and the display of the final search results 85 thereon.

In an embodiment, the system 10 also includes the classification engine 62 configured to classify the lighting scenarios from the horticultural lighting scenario data storage 30 according to similarities between the lighting scenario, for example relative to specific lighting scenario attributes thereof. For example and without being limitative, in an embodiment, the classification engine 62 is configured to process the lighting scenario attributes 32 from the horticultural lighting scenario data storage 30, to identify lighting scenarios having similar lighting scenario attributes 32. For example and without being limitative, in an embodiment, the classification engine 62 can be configured to process the lighting scenario attributes 32 from the horticultural lighting scenario data storage 30, to identify lighting scenarios having similar patterns of the spectral power distribution over the time period of the lighting scenario, similar programming instructions, similar metadata, similar runtime data, etc.

In an embodiment, the classification engine 62 cooperates with the search module 60 to identify a list of lighting scenarios to be provided as result of the search to a user. In other words, the classification engine 62 cooperates with the search module 60 to supplement the preliminary search results 64 obtained from the search performed by the search module 60. For instance, in an embodiment following a search performed by the search module 60, the classification engine 62 can be queried by the search module 60, to identify lighting scenarios which did not match the search parameters 61, but are classified as having the highest level of similarities as the lighting scenarios included in the preliminary search results 64 including the lighting scenarios retrieved from the horticultural lighting scenario data storage 30 (i.e. the lighting scenarios having lighting scenario attributes 32a matching the search parameters 61 relative to the user defined lighting scenario attributes). In an embodiment, the classification engine 62 can provide lighting scenarios having a similarity level equal or higher than a predetermined similarity threshold with the lighting scenarios identified in the preliminary search results 64 obtained by the search module 60 (i.e. the lighting scenarios retrieved from the horticultural lighting scenario data storage 30 during the search performed by the search module 60). The search module 60 can subsequently transmit the final search results 85 including the preliminary search results 64 and the additional lighting scenarios from the classification engine to the graphical user interface 80, for display thereon.

In an alternative embodiment, the classification engine 62 could also be used to provide a list of lighting scenarios offering similar lighting scenario attributes 32 as a user specified lighting scenario. For example and without being limitative, the user specified lighting scenario can be received from the graphical user interface 80 of the user computing device 82 in data communication with the system computing device 20. Once again, for example, the classification engine 62 can provide lighting scenarios having a similarity level equal or higher than a predetermined similarity threshold with the user specified lighting scenario. For example and without being limitative, the classification engine 62 can be used to perform look-alike searches between lighting scenarios, considering the spectral power distribution of the user specified lighting scenario used as reference lighting scenario and the evolution of the spectral power across the scenario timeline.

In an embodiment, the classification engine 62 can perform the classification using a lighting scenario classification model 65. In an embodiment, the lighting scenario classification model 65 can be a machine learning model stored on a computer-readable memory and trained using a labelled dataset of lighting scenarios in which the scenarios are labelled regarding similarities therebetween. The lighting scenario classification model can be configured to learn from the outcome of previous categorization of similarities between lighting scenarios, in order to classify the lighting scenarios.

In an embodiment, the system 10 further includes the trading module 70 configured to receive a trading request 71 for a lighting scenario and allow trading of the lighting scenario, if the trading policies 73 of the lighting scenarios are respected. One skilled in the art will understand that, in the course of the present description, the term "trading request" is understood to mean a request for use, access, transfer, download and/or publishing of a lighting scenario from an acquirer. Hence, in other words, the trading module 70 is configured to provide the functional features to allow users to select desired lighting scenarios and execute the actions to allow deployment of the lighting scenario on the user's horticultural structure 26.

In an embodiment, the trading module 70 is in data communication with a lighting scenario policies data storage 72 containing the trading policies 73 of the lighting scenarios of the horticultural lighting scenario data storage 30 which are offered for trading. In an embodiment, the trading policies 73 may be provided in a dataset including the data relative to the trading conditions of the corresponding lighting scenario. For example and without being limitative, in an embodiment the trading policies 73 can include licensing conditions of the lighting scenario (e.g. duration of license, geographical limits of the license, type of use (commercial, educational, etc.), etc.), access rights conditions granted by the trading of the lighting scenario (e.g. the number of users or groups of user allowed to access the lighting scenario), financial condition of the trading of the lighting scenario (e.g. acquisition cost), etc.). One skilled in the art will understand that, in an alternative embodiment (not shown), the trading policies 73 of the lighting scenarios offered for trading can be stored in the horticultural lighting scenario data storage 30 along with the lighting scenario attributes 32 defining the data relative to the lighting scenarios.

The trading module 70 is configured to retrieve the trading policies 73 of a corresponding lighting scenario from the lighting scenario policies data storage 72 and to enforce the trading policies for users of the system wishing to use, access, transfer, download and/or publish a lighting scenario. In other words, when the system issues a trading request 71 defining a user request for use, access, transfer, download and/or publishing of a lighting scenario, the trading module 70 is configured to determine whether the desired action for the specific trading request of the specific user respects the trading policies. In the affirmative, the trading module 70 allows the use, access, transfer, download and/or publishing of the lighting scenario by the user for subsequent deployment on the user's horticultural structure 26. In the negative, the trading module 70 prevents the use, access, transfer, download and/or publishing of the lighting scenario by the user. For example, in an embodiment, the trading module 70 operates to determine that a user requesting to download a lighting scenario has previously purchased the lighting scenario (in accordance with the financial condition of the trading policies 70 of the lighting scenario) before the user is allowed to perform the download onto the user's computing device 82. In another embodiment, the trading module 70 can also operate to determine that the user issuing the trading request of a lighting scenario to publish the lighting scenario to its horticultural structure is an authorized user (in accordance with the access rights conditions of the trading of the lighting scenario defined in the lighting scenario policies 73) and respects the condition of the license, before the user is allowed to publish the lighting scenario to the user's horticultural structure 26.

In an embodiment, the trading module 70 can also operate to automatically update (or notify a user that an update is available), when a newer version of a lighting scenario acquired, used, downloaded and/or published by a user is uploaded to the horticultural lighting scenario data storage 30. In an embodiment, the trading module 70 can retrieve the trading policies 73 of the corresponding lighting scenario from the lighting scenario policies data storage 72 and automatically update (or notify a user that an updates version is available) only when this is in compliance with the trading policies of the lighting scenario. For example and without being limitative, the automatic update can be performed by downloading or publishing the newer version of the lighting scenario to the corresponding user computing device 82 or horticultural structure 26.

Now referring to FIGS. 3A to 3D, embodiments of the graphical user interface 80 of the system 10 are shown. For example and without being limitative, in an embodiment, the graphical user interface 80 can be part of a web-based application which can be accessed and displayed using the user computing device 82, through a network, such as the Internet or the like.

The graphical user interface 80 cooperates with the search module 60, the classification engine 62 and the trading module 70 to provide user interaction an allow the users to browse, search, classify, use, access, download and/or publish lighting scenarios stored in the horticultural lighting scenario data storage 30.

Figure 3A:
FIGS. 3A to 3D are schematic representations of graphical user interfaces of the system for managing horticultural lighting scenarios of FIGS. 1 and 2, in accordance with an embodiment.

FIG. 3A shows an example of a search page 83 of the graphical user interface 80, wherein keywords to be used as search parameters can be entered by a user in a search bar 84. One skilled in the art will understand that, for example, the user inputs can be provided via input devices (e.g. a mouse, keyboard, joystick, touchscreen, track pads, etc.) of the associated user computing device 82. In the embodiment shown, the entered keywords can be used as search parameters 61 transferred to the search module 60 for performing the search. The final search results 85 received from the search module 60 (which can operate in combination with the classification engine 62) are displayed on the graphical user interface 80 to allow user selection. As shown in FIG. 3A, in an embodiment, further search options can be provided to the user in the graphical user interface 80 (e.g. include/exclude metadata from the search, include/exclude programming instructions from the search, include/exclude scenarios with similar pattern of spectral power, a minimum value of achievement of integral indicators from the target value, etc.). The selected search options are provided to the search module 80 as search parameters 82, which adapts the scenario data inquiry 63 in accordance with the selected search options.

Figure 3B:
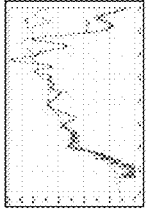
Figure 3C:
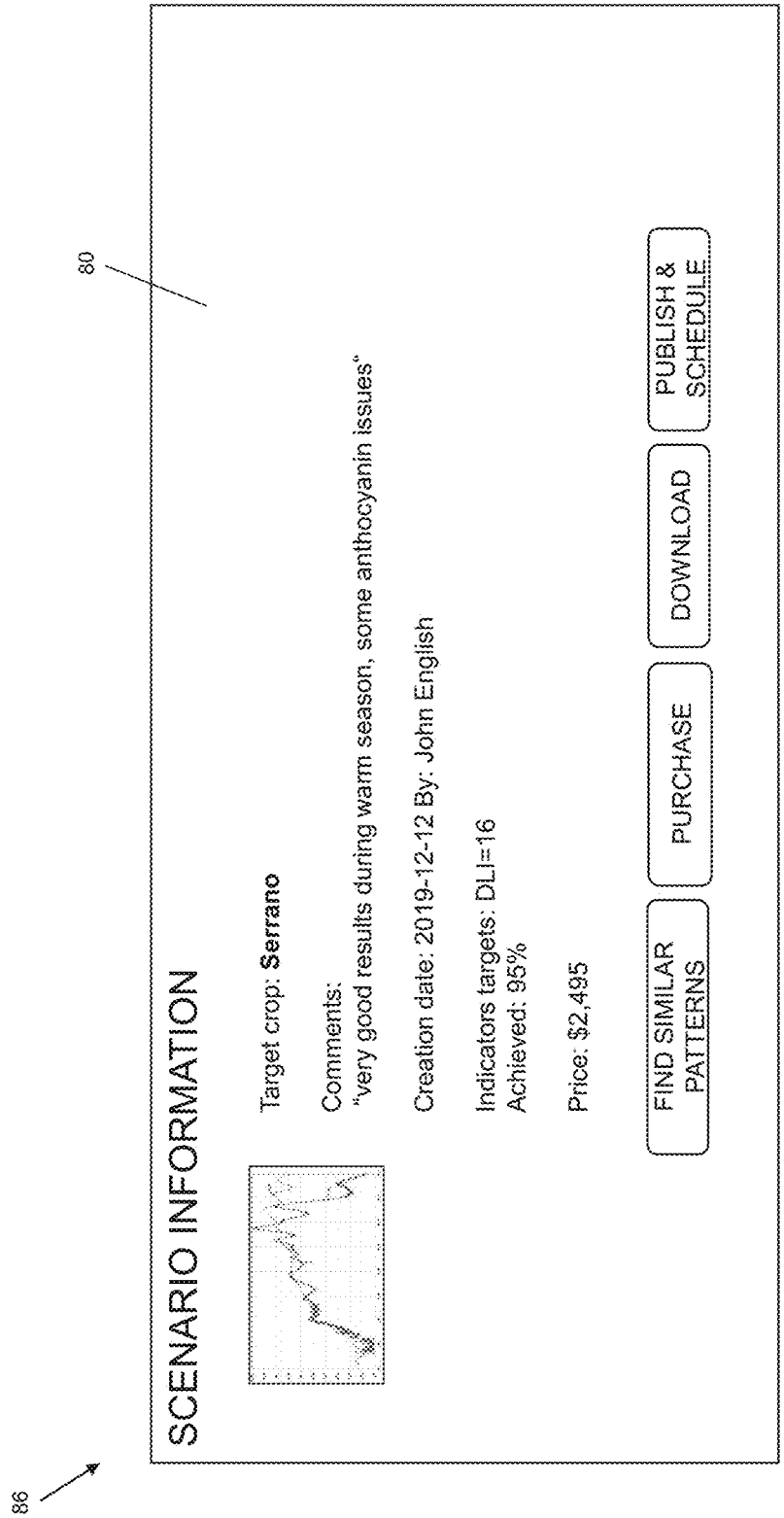

FIGS. 3B and 3C show instances of scenario selection pages 86 displayed, for example, upon selection of one of the lighting scenarios from the list of final search results 85 displayed in the graphical interface 80 of a search page 83 as shown in FIG. 3A. As can be seen, more details concerning the lighting scenario can be provided to the user on scenario selection pages 86. As will be understood, the graphical user interface 80 receives the data to be displayed from the horticultural lighting scenario data storage 30 and displays the data in order to provide the user with the necessary information to evaluate the relevance of the lighting scenario for his/her needs. In the embodiment shown, the graphical user interface 80 also allows searching lighting scenarios offering similar patterns of spectral power as the selected lighting scenario. If a user selects such an option (by clicking the corresponding button) the classification engine 62 can be used to perform the above-mentioned look-alike search for the reference lighting scenario, in order to provide a list of lighting scenarios having a similarity pattern evolution of the spectral power across the scenario timeline (for example in a format similar to the final search results 85 of FIG. 3A).

In the embodiment shown, download options and publishing options are also provided to the user in the interface 80. One skilled in the art will understand that, in alternative embodiments, other option for access to the lighting scenario could also be provided. If a user selects download or publishing of the scenario using the graphical user interface 80, the trading module 70 operates to retrieve the trading policies 73 of the corresponding lighting scenario from the lighting scenario policies data storage 72 and enforce the trading policies. If the user is authorized to perform the download or publishing of the lighting scenario, the trading module 70 allows the lighting scenario to be downloaded to the user computing device 82 or published to a acquirer's horticultural structure 26 associated to the user, for example using a module similar to the publishing module 40.

Figure 3D:
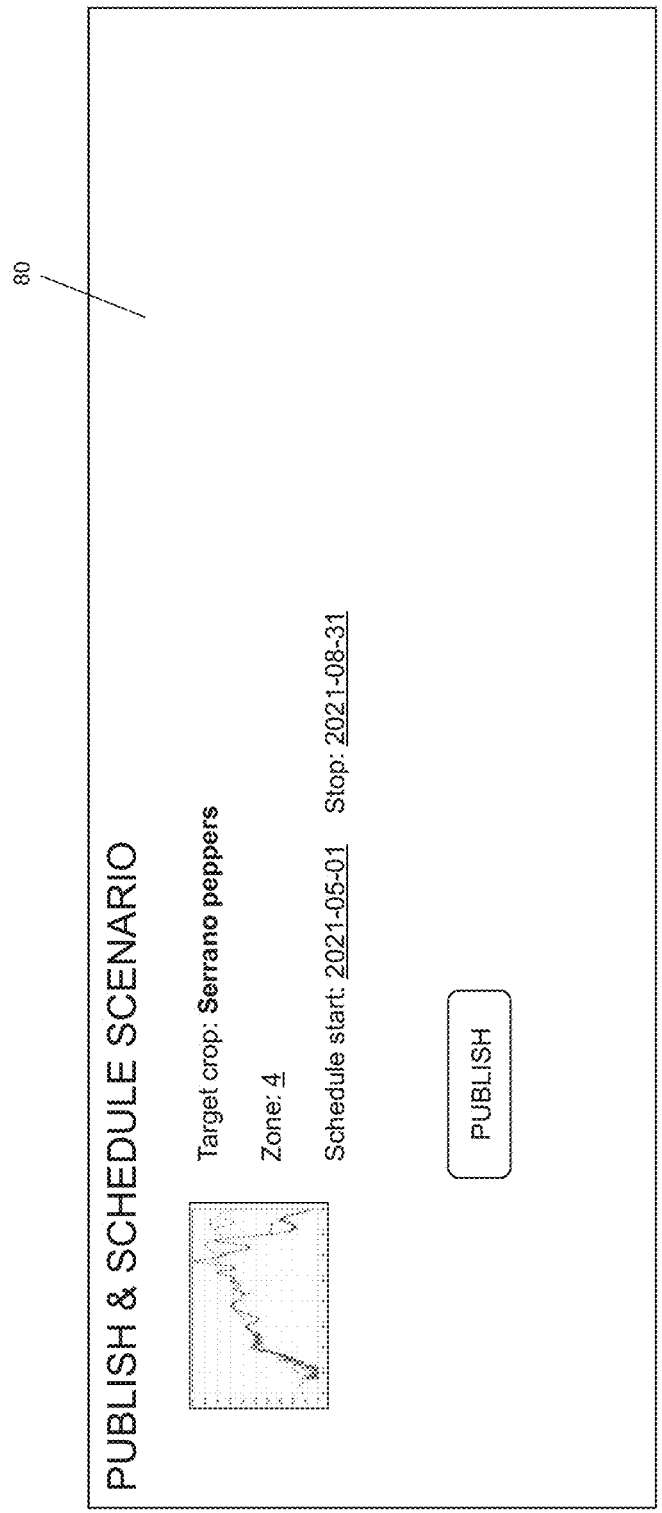

FIG. 3D shows an additional page of the graphical user interface 80 allowing a user to define publishing parameters for publishing of a lighting scenario to a horticultural structure, if a publishing option is selected and allowed by the trading module 70.

In an embodiment (not shown in the Figures), the graphical user interface 80 also includes a display to allow users to upload new lighting scenarios to the system 10 (i.e. upload new lighting scenario to be stored in the horticultural lighting scenario data storage 30).

The system 10 described above may be implemented in computer programs executed on programmable computers. A programmable computer generally includes at least a processor and a data storage system that may include volatile and non-volatile memory and/or storage elements. The programmable computer may be a programmable logic unit, a mainframe computer, server, and personal computer, cloud-based program or system, laptop, personal data assistance, cellular telephone, smartphone, wearable device, tablet device, virtual reality devices, smart display devices, set-top box, video game console, portable video game devices, or virtual reality device. In some embodiments, the systems and methods may be provided as a plug-in. In some embodiments, one or more components of the system 10 having been described may be provided as a plug-in. The expression "plug-in" herein refers to a software component adding a predetermined feature or functionality to the system 10. Providing the different modules as plug-ins may be associated with some benefits, such as, for example and without being limitative, adaptability, modularity and flexibility.

Of note, the computer programs may be implemented in a high level procedural or object-oriented programming and/or scripting language to communicate with a computer system. The programs could alternatively be implemented in assembly or machine language, if desired. In these implementations, the language may be a compiled or interpreted language. The computer programs are generally stored on a storage media or a device readable by a general or special purpose programmable computer for configuring and operating the computer when the storage media or device is read by the computer to perform the procedures described herein. In some embodiments, the systems may be embedded within an operating system running on the programmable computer.

Method for Managing Horticultural Lighting Scenarios

Figure 4:
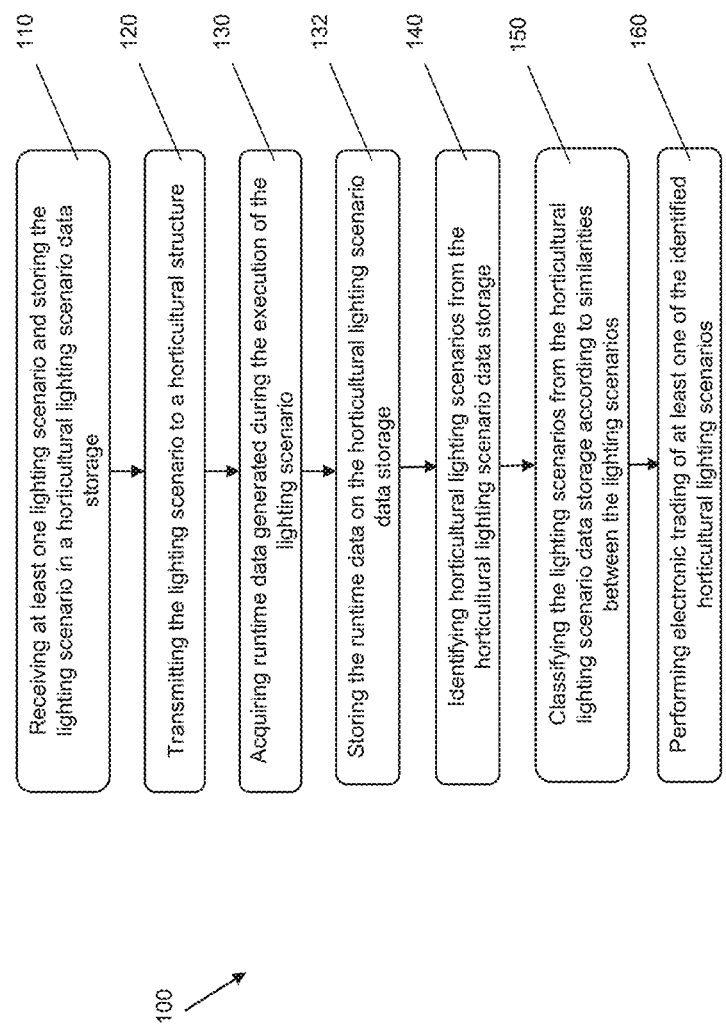
FIG. 4 is a flowchart showing the steps of a method for managing horticultural lighting scenarios, in accordance with an embodiment.

Now turning to FIG. 4, there is shown steps of a method 100 for managing horticultural lighting scenarios, in accordance with an embodiment.

One skilled in the art will understand that the method described herein can include steps for implementing in the present method for managing horticultural lighting scenarios all of above-mentioned characteristics of the corresponding system. Hence, it will be understood that even though steps corresponding to above-described corresponding system are not all described in the present description, these steps form part of the present method.

The method 100 includes a first general step 110 of receiving at least one lighting scenario and storing the lighting scenarios in a horticultural lighting scenario data storage. The at least one lighting scenario is characterized by lighting scenario attributes and the lighting scenario attributes of the lighting scenario are stored in the horticultural lighting scenario data storage. In an embodiment, this step can include storing a dataset including a plurality of sets of control parameters for each lighting scenario in the horticultural lighting scenario data storage. In an embodiment, this step further includes receiving and storing metadata relative to each corresponding horticultural lighting scenario in the horticultural lighting scenario data storage, as part of the corresponding dataset.

In an embodiment, the method 100 also includes the step 120 of transmitting the lighting scenario to a horticultural structure for the lighting scenario to be deployed on horticultural lighting apparatuses. In an embodiment, this step includes retrieving the plurality of sets of control parameters defining the lighting scenario from the horticultural lighting scenario data storage and uploading the plurality of sets of control parameters to the horticultural structure.

The method 100 also includes the further step 130 of acquiring runtime data generated during the execution of the lighting scenario from the horticultural structure and 132 of storing the runtime data on the horticultural lighting scenario data storage as additional lighting scenario attributes of the corresponding lighting scenario. In an embodiment, this step includes including the runtime data in the dataset of the corresponding lighting scenario.

The method 100 also includes the step 140 of identifying horticultural lighting scenarios from the horticultural lighting scenario data storage, in which lighting scenarios having attributes matching the user specified searched parameters are identified and returned as preliminary search results.

Referring to FIG. 5, in an embodiment, step 140 of identifying horticultural lighting scenarios from the horticultural lighting scenario data storage includes substep 142 of receiving from a graphical user interface search parameters relative to user defined lighting scenario attributes. Step 140 also include substep 144 of generating a scenario data inquiry relative to the user defined lighting scenario attributes and substep 146 of querying the horticultural lighting scenario data storage using the scenario data inquiry to identify and retrieve the lighting scenarios having attributes matching the searched parameters. In an embodiment, substep 144 of generating the scenario data inquiry can include further subsets of selecting an inquiry template stored in a memory and formatting the scenario data inquiry based on a required inquiry format. Following step 146 preliminary search results including the identified lighting scenario are returned.

In an embodiment a further substep 148 of transmitting final search results to the graphical user interface for display thereon is also provided. As will be described below, the preliminary search results can be used as is in the final search results (i.e. the preliminary search results are used as final search results) or can be supplemented to provide the final search results.

Returning to FIG. 4, in an embodiment, the method 100 can also include a step 150 of classifying the lighting scenarios from the horticultural lighting scenario data storage according to similarities between the lighting scenarios.

Referring to FIG. 6, in an embodiment, this step 150 can include the substeps 152 of processing the data from the horticultural lighting scenario data storage and 154 of identifying lighting scenarios having similarities with one or more specific lighting scenarios. In an embodiment, substep 154 can include identifying lighting scenarios offering similar patterns of the spectral power distribution over the time period of the lighting scenario, similar programming instructions, similar metadata, similar runtime data, etc. It will be understood that, in an embodiment, the method can be free of step 150 of classifying the lighting scenarios from the horticultural lighting scenario data storage according to similarities between the lighting scenarios.

In an embodiment where the method includes step 150 of classifying the lighting scenarios from the horticultural lighting scenario data storage according to similarities between the lighting scenarios, it can be used to supplement the preliminary search results by identifying lighting scenarios having similarities with the lighting scenarios included in the preliminary search results. For example and without being limitative, lighting scenarios having a similarity level equal or higher than a predetermined similarity threshold with the lighting scenarios identified in the preliminary search results can be identified and used to supplement the preliminary search results to define the final search results.

In another embodiment step 150 of classifying the lighting scenarios from the horticultural lighting scenario data storage according to similarities between the lighting scenarios can be performed to identify lighting scenarios having a similarity level equal or higher than a predetermined similarity threshold with a user specified lighting scenarios received from a graphical user interface. For example and without being limitative, the user specified lighting scenarios received from the graphical user can be a lighting scenario of the final search results displayed on the graphical user interface and selected by a user on the graphical user interface.

Returning again to FIG. 4, in an embodiment, the method 100 further includes the step 160 of performing electronic trading of at least one of the identified horticultural lighting scenarios.

Referring to FIG. 7, in an embodiment, step 160 of performing electronic trading of at least one of the identified horticultural lighting scenarios includes the substep 162 of receiving a trading request relative to a lighting scenario and substep 164 of enforcing the trading policies of the lighting scenario.

Referring to FIG. 8, in an embodiment, this substep includes the further substeps of retrieving the trading policies of the corresponding lighting scenario from a lighting scenario policies data storage (164a), determining if the trading policies are respected (164b) and allowing the execution of the trading request, if the trading policies of the lighting scenario are respected (164c) or rejecting the execution of the trading request, if the trading policies of the lighting scenario are not respected (164d). For example and without being limitative, in an embodiment, the trading request defines a user request for use, access, transfer, download and/or publishing of a lighting scenario stored in the horticultural lighting scenario data storage.

In accordance with another aspect of the present description, there is provided a non-transitory computer readable storage medium having stored thereon computer executable instructions that, when executed by a processor, cause the processor to perform the method that has been previously described. The non-transitory computer storage medium can be integrated to the systems or assemblies that have been described in the present description. The non-transitory computer storage medium could otherwise be operatively connected with the systems or assemblies. In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

Working Examples of the System and Method for Managing Horticultural Lighting Scenarios

First Example

A large farming operation uses advanced lamps capable of reproducing dynamic spectrum through lighting scenarios.

There is a business unit responsible for the production aspects, and one unit responsible for the research aiming at improving the growth recipes, including the lighting scenario, and both business units are distinct and independently run.

The research team consists of permanent and interns' agronomists. They conduct multiple projects concurrently. The research staff composition is the subject of frequent staff changes.

The production team must be able to schedule and control the lightning scenario run by a pool of horticultural lamps in the context of their production objectives. The lighting scenario schedule may be the subject of frequent changes. The research team needs access to the lighting scenario execution history and results as input data to the research projects.

The research team also operate a smaller number of horticultural lamps in the experimental space, and they need to be able to duplicate some of the production lighting scenario within the experimental section.

It is desired that once a new lighting scenario has been developed and has shown promising results in the experimental area, the lighting scenario can then be proposed back to the production team. It is then up to the production team to decide if they will use it and when.

In this operational context, the system and method can be used to upload every lighting scenario scheduled by the production team for every crop and in any zone of the horticultural structure. The system can be used to search for the lighting scenarios and publish the lighting scenarios to the horticultural structure such that the lighting scenarios are pushed to the horticultural lamps. The time, date and duration of the illuminations are archived alongside target indicators and results achieved in the horticultural lighting scenario data storage, using the runtime data acquisition module.

From the research team perspective, the system can be used as a live connected repository that the team can use to search and explore the lighting scenarios, independently of the production team. The system can also be used as a connected illumination repository for running the research activities.

For the production team, the system can be used as a lamp connected self-service searchable lighting scenarios catalog for accessing the fruit of the research team's work.

A key element is the presence of the target indicators and results generated from the execution of the lighting scenario in the horticultural structure, being achieved in the horticultural lighting scenario data storage (which can include, for example and without instance integral indicator data, integral indicator target data and external information generated and/or collected during the execution of the lighting scenario in the horticultural structure), which allows the production team to search for lighting scenarios having the desired performance/operation parameters and or determine if identified lighting scenarios meet the desired performance/operation parameters.

Second Example

An industrial seeds production company market plant genetics products and especially designed lighting scenarios that are conceived to produce the best possible results when used together.

The seed-lighting scenario combination is conceived using connected lamps capable of running dynamic natural light lighting scenario.

Specific lighting scenario for specific seed varieties can be made available to clients online via the graphical user interface included in a web application. The purchase of specific seed products comes with a license enabling access to the associated lighting scenario. The client can therefore connect to the system using the graphical user interface, to search for the lighting scenarios, access the lighting scenario and push the scenario to its own lamps (e.g. by downloading the lighting scenario to a user computing device and performing subsequent deployment on its horticultural structure including the horticultural lamps; or by publishing the lighting scenario to its horticultural structure including the horticultural lamps from the system). Various policies can be enforced by the vendor, such as seasonal licenses, maximum crop size, etc.

In an embodiment, the client can get the light scenario updated seamlessly.

In that context, the distribution of lighting scenario developed by the vendor using its own horticultural infrastructure is controlled by the vendor through the system. The duplication of the lighting scenario on the client's own horticultural infrastructure can be performed by the client and the lighting scenario can be pushed to the client own lamps, resulting in a fully connected configuration, high level of agility, lighting scenario integrity and security.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A system for managing horticultural lighting scenarios, the system comprising:
    a horticultural lighting scenario data storage storing lighting scenario attributes of at least one lighting scenario;
    a publishing module configured to transmit one of the at least one lighting scenario to a horticultural structure, for deployment of the one of the at least one lighting scenario on at least one horticultural lighting apparatus thereof;
    a runtime data acquisition module configured to acquire runtime data generated during the execution of the one of the at least one lighting scenario on the at least one horticultural lighting apparatus and store the runtime data on the horticultural lighting scenario data storage as additional lighting scenario attributes of the one of the at least one corresponding lighting scenario;
    a search module configured to receive search parameters relative to user defined lighting scenario attributes from a graphical user interface, generate a scenario data inquiry relative to the user defined lighting scenario attributes and query the horticultural lighting scenario data storage to identify and retrieve identified lighting scenarios having lighting scenario attributes matching the searched parameters; and
    a trading module configured to receive a trading request for one of the identified lighting scenarios from the graphical user interface, retrieve the trading policies of the identified lighting scenario and enforce the trading policies of the identified lighting scenario.

2. The system for managing horticultural lighting scenarios of claim 1, further comprising the at least one horticultural lighting apparatus receiving the lighting scenario as input and illuminating plants or crops in accordance with the lighting scenario.

3. The system for managing horticultural lighting scenarios of claim 1, further comprising a classification engine configured to classify the lighting scenarios from the horticultural lighting scenario data storage according to similarities between lighting scenario attributes thereof.

4. The system for managing horticultural lighting scenarios of claim 3, wherein the classification engine is configured to process the lighting scenario attributes from the horticultural lighting scenario data storage to identify lighting scenarios having at least one of similar patterns of the spectral power distribution over the time period of the lighting scenario, similar programming instructions, similar metadata and similar runtime data.

5. The system for managing horticultural lighting scenarios of claim 1, wherein the trading request received by the trading module defines at last one of a user request for use, access, transfer, download and/or publishing of a lighting scenario stored in the horticultural lighting scenario data storage.

6. The system for managing horticultural lighting scenarios of claim 1, wherein the trading module is configured to enforce the trading policies of the identified lighting scenario by determining if the trading policies are respected and allowing the execution of the trading request, if the trading policies of the lighting scenario are respected or rejecting the execution of the trading request, if the trading policies of the lighting scenario are not respected.

7. The system for managing horticultural lighting scenarios of claim 1, wherein the user defined lighting scenario attributes of the search parameters include at least one of a spectral power distribution over the time period of the lighting scenario, programming instructions relative to the lighting scenario, metadata associated to the lighting scenario and runtime data associated to the lighting scenario.

8. The system for managing horticultural lighting scenarios of claim 1, wherein the runtime data includes at least one of integral indicator data, integral indicator target data and external information generated or collected during the execution of the lighting scenario in the horticultural structure.

9. The system for managing horticultural lighting scenarios of claim 1, wherein the search module is configured to generate the scenario data inquiry by selecting an inquiry template stored in a memory and to format the scenario data inquiry based on a required inquiry format.

10. A computer implemented method for managing horticultural lighting scenarios, the method comprising the steps of:
  receiving at least one lighting scenario characterized by lighting scenario attributes and storing the lighting scenario attributes of the lighting scenario in a horticultural lighting scenario data storage;
  for each one of the at least one lighting scenario:
    transmitting the lighting scenario to a horticultural structure for the lighting scenario to be deployed on at least one horticultural lighting apparatus; and
    acquiring runtime data generated during the execution of the lighting scenario on the at least one horticultural lighting apparatus and storing the runtime data on the horticultural lighting scenario data storage as additional lighting scenario attributes of the lighting scenario;
  identifying horticultural lighting scenarios from the horticultural lighting scenario data storage based on user defined search parameters;
  performing electronic trading of at least one of the identified horticultural lighting scenarios.

11. The computer implemented method of claim 10, wherein the step of transmitting the lighting scenario to a horticultural structure includes retrieving a plurality of sets of control parameters defining the lighting scenario from the lighting scenario attributes stored in the horticultural lighting scenario data storage for this lighting scenario and uploading the plurality of sets of control parameters to the horticultural structure.

12. The computer implemented method of claim 10, wherein the runtime data includes at least one of integral indicator data, integral indicator target data and external information generated or collected during the execution of the lighting scenario in the horticultural structure.

13. The computer implemented method of claim 10, wherein the step of identifying horticultural lighting scenarios from the horticultural lighting scenario data storage includes receiving the search parameters relative to user defined lighting scenario attributes, generating a scenario data inquiry relative to the user defined lighting scenario attributes and querying the horticultural lighting scenario data storage to identify and retrieve the lighting scenarios having lighting scenario attributes matching the searched parameters.

14. The computer implemented method of claim 13, wherein the step of generating a scenario data inquiry includes selecting an inquiry template stored in a memory and formatting the scenario data inquiry based on a required inquiry format.

15. The computer implemented method of claim 10, wherein the step of performing electronic trading of at least one of the identified horticultural lighting scenarios includes receiving a trading request for the at least one of the retrieved lighting scenarios, retrieving the trading policies of the corresponding lighting scenario, determining if the trading policies are respected and allowing the execution of the trading request, if the trading policies of the lighting scenario are respected or rejecting the execution of the trading request, if the trading policies of the lighting scenario are not respected.

16. The computer implemented method of claim 15, wherein the trading request defines at last one of a user request for use, access, transfer, download and/or publishing of a lighting scenario stored in the horticultural lighting scenario data storage.

17. The computer implemented method claim 10, further comprising the step of classifying the lighting scenarios from the horticultural lighting scenario data storage according to similarities between the lighting scenarios.

18. The computer implemented method of claim 17, wherein the step of classifying the lighting scenarios from the horticultural lighting scenario data storage according to similarities between the lighting scenarios includes processing the data from the horticultural lighting scenario data storage and identifying lighting scenarios having lighting scenario attributes similar to the lighting scenario attributes of one or more specific lighting scenarios.

19. The computer implemented method of claim 18, wherein the step of identifying lighting scenarios having lighting scenario attributes similar to the lighting scenario attributes of one or more specific lighting scenarios includes identifying lighting scenarios offering at least one of similar patterns of the spectral power distribution over the time period of the lighting scenario, similar programming instructions, similar metadata and similar runtime data.

20. A non-transitory computer readable storage medium having stored thereon computer executable instructions that, when executed by a processor, cause the processor to perform the steps of the method defined in claim 10.

* * * * *